United States Patent Office 3,634,300
Patented Jan. 11, 1972

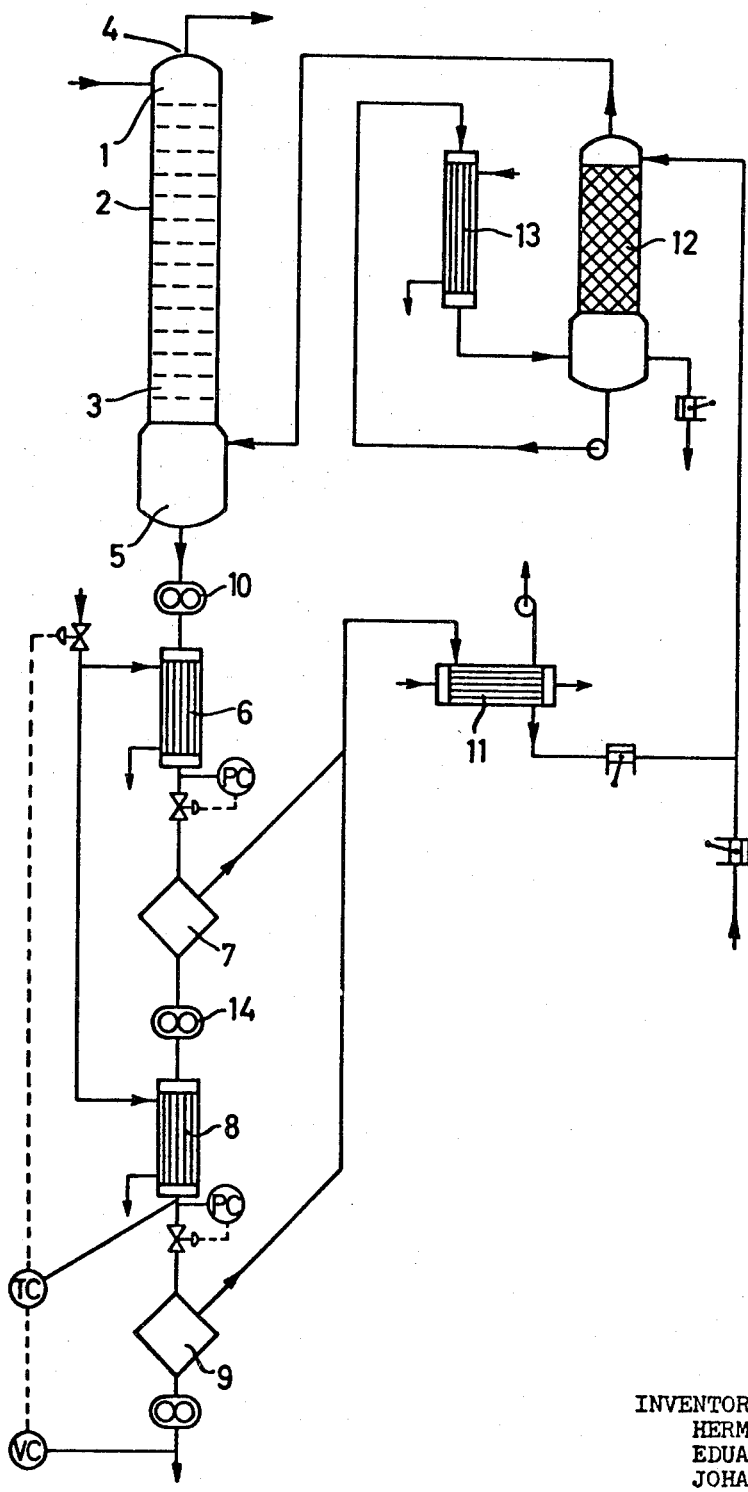

3,634,300
REMOVING UNREACTED MONOMERS FROM ACRYLONITRILE POLYMER SOLUTIONS AND CONCENTRATION OF THE SOLUTIONS
Hermann Fischer and Eduard Heil, Limburgerhof, Johann Swoboda, Heidelberg, and Richard Thoma, Ludwigshafen, Germany, assignors to Badische Anilin- & Soda-Fabrik Aktiengesellschaft, Ludwigshafen (Rhine), Germany
Filed Nov. 4, 1970, Ser. No. 86,762
Claims priority, application Germany, Nov. 8, 1969, P 19 56 286.8
Int. Cl. C08f 47/22, 53/20
U.S. Cl. 260—32.6 N      4 Claims

ABSTRACT OF THE DISCLOSURE

A continuous process for the removal of residual monomers from solutions of acrylonitrile polymers in dimethylformamide and for concentrating the solutions in a sequence of separating zones, pressure release zones, heating zones and pressure release zones. The process is distinguished by short residence times and only slight damage to the polymer solutions. The solutions obtained may serve for the production of filaments, threads or fibers.

---

This invention relates to a continuous method of removing unreacted monomers from a solution of acrylonitrile polymers in dimethylformamide and concentrating the solution.

It is known that the separation of unreacted monomers from a solution of a polymer and concentration of the solution by distillation can be carried out in a stirred vessel. When the content of residual monomers is high, the polymer solution has to be previously diluted with a solvent for adequate removal of the residual monomers. This method has the disadvantage that long residence times of the polymer solution in the stirred vessel are necessary and that these residence times increase with increasing size of the vessel and may result in damage to the product. After polymerization occurring during this time results in a decrease in the mean molecular weight and in a change in the composition of the polymer. Another disadvantage is that this method requires batchwise operation.

It is known also that separation of unreacted monomers from a polymer solution and concentration of the solution may be carried out by distillation in a falling film evaporator (see Burger, Gröbe, Peter, Schönherr, Faserforschung und Textiltechnik, volume 18 (1967), part 11, page 503). Although this method permits continuous operation and a short residence time of the product in the heated zone, a high content of monomers in the feed or a lowpermissible content of residual monomers necessitates strong dilution of the feed with solvent and the need to evaporate this added solvent results in a high energy consumption. A disadvantage of this method is furthermore that there is an upper limit to the polymer content of the concentrated solution when the increase in concentration is accompanied by an increase in viscosity which prevents processing of the concentrated polymer solution in a falling film evaporator. Redissolution of any gel particles present in the solution devoid of monomer at polymer concentrations which are not too high is not possible in this method because of the short residence times. Finally a falling film evaporator is a fairly elaborate piece of equipment and limits are set on size.

It is an object of the invention to provide a continuous process for the removal of unreacted volatile monomers from solutions of acrylonitrile polymers in dimethylformamide, and for the concentration of these solutions at elevated temperature, which requires only short residence times in the heated zones and causes the minimum of damage to the polymer solution.

This object is achieved according to the invention by a process for the continuous removal of unreacted volatile monomers from solutions of acrylonitrile polymers having at least 85% by weight of acrylonitrile units is dimethylformamide and for the concentration of these solutions at elevated temperature and subatmospheric pressure, which comprises expelling monomeric acrylonitrile from 10 to 30% by weight solutions of acrylonitrile polymers which contain 10 to 30% by weight of volatile residual monomers (with reference to the total weight of solution) in a separation zone at a pressure of from 50 to 300 mm. Hg and at a temperature of from 40° to 120° C., supplying vaporous dimethylformamide at the end of the separating zone and withdrawing monomeric acrylonitrile together with any other volatile monomers present, with some of the dimethylformamide, in vapor form at the beginning of the separation zone, expanding the solution to a pressure of from 5 to 100 mm. Hg in a first expansion zone, heating the solution (cooled by the expansion) in a heating zone by from 20° to 100° C. at a pressure which is higher than the vapor pressure of the solution at the temperature used, and then expanding to a pressure of from 5 to 100 mm. Hg in a second expansion zone.

The starting materials are generally solutions of acrylonitrile polymers having at least 85% by weight of acrylonitrile units, such as are obtained direct in the polymerization of acrylonitrile, with or without comonomers, in dimethylformamide. The rapid separation of the acrylonitrile and other monomers prevents further polymerization into undesired oligomers so that it is not necessary to add chain stoppers in the polymerization of acrylonitrile.

The residual monomers are the usual olefinic monomers remaining in the solution after polymerization for the production of acrylonitrile polymers having at least 85% by weight of acrylonitrile units. Generally of acrylonitrile, but in the production of conventional acrylonitrile copolymers, conventional comonomers such as $\alpha,\beta$-olefinically unsaturated carboxylic acids having three to five carbon atoms such as acrylic acid or methacrylic acid or derivatives of such acids such as their esters with alcohols having one to eight carbon atoms, particularly alkanols such as methyl acrylate or n-butyl acrylate or 2-ethylhexyl methacrylate or methyl methacrylate, and also vinylbenzene hydrocarbons such as styrene or vinyltoluene or vinyl esters or aliphatic monocarboxylic acids having two to seven carbon atoms such as vinyl acetate or vinyl propionate, also vinyl halides such as vinyl chloride or vinylidene chloride, may be contained as residual monomers (as well as acrylonitrile) in small amounts, for example in an amount of from 0.2 to 3% by weight.

The starting material is generally a 10 to 30%, particularly a 15 to 22%, by weight solution of an acrylonitrile polymer which contains from 30 to 10%, particularly from 22 to 15% by weight of monomeric acrylonitrile with reference to the total weight of the solution. Acrylonitrile and any volatile comonomers are separated in a substantially vertical separation zone which as a rule is a distillation column, at a pressure of from 50 to 300, advantageously from 100 to 150, mm. Hg and at a temperature of from 40° to 120° C., advantageously from 60° to 100° C., vaporous dimethylformamide being supplied countercurrent to the polymer solution at the lower end of the column. Some of the dimethylformamide is separated in vapor form together with the acrylonitrile at the top of the column. A suitable conveying means, for example a gear pump, supplies the polymer solution to an expansion zone in which the solution is expanded down to a pressure of advantageously from 5 to 100, preferably from 10 to 30, mm. Hg and thereby cooled. The temperature of the solution is thereby changed to 30° to 90° C. and 40° to 65° C., respectively. Vaporous constituents formed in the expansion zone are withdrawn. The cooled solution formed by the expansion is supplied by conveying means to a heating zone, heated by 20° to 100° C., preferably by 40° to 60° C., at a pressure which again is higher than the vapor pressure of the solution at the temperature used, and then again expanded down to a pressure of advantageously from 5 to 100, preferably from 10 to 30, mm. Hg in a second expansion zone. The vaporous fraction formed in the expansion zone is withdrawn.

It may be particularly advantageous to provide another heating zone after the second expansion zone and after that another expansion zone. The temperature and pressure conditions in the additional zones correspond to those in the previous zones.

In a preferred embodiment, the polymer solution after it has left the separation zone and before it enters the first expansion zone, is brought into a heating zone in which the solution is heated advantageously by 10° to 50° C., preferably by 20° to 40° C. at a pressure which is above the vapor pressure of the solution at the temperature used.

The process according to the invention is advantageously carried out in a conventional rectification column as the separation zone and it may have a rectifying section to increase the concentration of the monomers. Sieve plates may advantageously be used as baffles, their number being chosen so that the amount of dimethylformamide vapor supplied at the bottom is low and the resultant residence time does not cause any damage to the product. The heating zone following the column is advantageously a bundle of tubes, the tubes through which the product flows having a rectangular cross-section. In this way there is an efficient transfer of heat, short residence times and only slight damage to the polymer solution. The designs of the expansion zones may be identical or different.

The expansion zones are for example evacuated subatmospheric pressure containers. The polymer solution discharged from the final expansion zone generally has a concentration of 22 to 32% by weight, particularly of 24 to 30% by weight, and a monomer content of from 0.5 to 0.05% by weight. The monomeric acrylonitrile separated in the separation zone, together with any comonomers present, may be worked up by distillation and returned to the polymerization.

The dimethylformamide vaporized in the two expansion zones is condensed, continuously freed from any acrylonitrile present by distillation, vaporized and recycled to the end of the separation zone and added to the acrylonitrile polymer solution. The formation of oligomers (which would soil the heating surface of the evaporation zone by cracking) in the vaporization of the condensate is thus avoided.

In a preferred embodiment of the process according to the invention the polymer concentration of the solution which has been concentrated is regulated by continuously measuring the viscosity of the acrylonitrile polymer solution following the final expansion zone and regulating the temperature in the heat zone(s) by a conventional method in dependence on the viscosity. For this purpose a constant amount of spinning solution is pumped through a capillary as a bleed stream. Deviations from the desired value of the pressure drop in the capillary change the desired value of the temperature of the product at the end of the heating zones.

The advantages of the process according to the invention include the continuous operation, the short residence time of the product in the heated zones, the small damage to the polymer solution resulting therefrom, and the possibility, described above, of interrupting the polymerization of acrylonitrile in dimethylformamide by the rapid removal of monomers and thus avoiding the addition of chain stoppers.

Polymer solutions obtained according to the invention may be further processed by conventional methods, for example by dry spinning or precipitation spinning to form filaments, threads or fibers. The filaments, threads or fibers have an excellent degree of whiteness.

The following example will illustrate in greater detail the process according to the invention with reference to the numerals (in brackets) shown in the accompanying drawing. The parts specified in this example are parts by weight.

EXAMPLE

A mixture of 100 parts of polyacrylonitrile, 93.4 parts of acrylinitrile and methyl acrylate and 354 parts of dimethylformamide flows continuously onto the uppermost tray 1 of a rectifying column 2 in which sieve trays are arranged. A vapor mixture off 11.2 parts of acrylonitrile and methyl acrylate and 181.2 parts of dimethylformamide is blown in below the lowermost tray 3 of the column. A vapor mixture of 92.1 parts of acrylonitrile and methyl acrylate and 42.7 parts of dimethylformamide is withdrawn at the top 4 of the column and condensed. The pressure at the top 4 of the column is 140 mm. and the temperature is 70° C. A solution of 100 parts of polyacrylonitrile, 12.5 parts of acrylonitrile and methyl acrylate and 492.5 parts of dimethylformamide is withdrawn by means of a gear pump 10 from the bottoms 5 of the column at a temperature of 100° C.

This solution is heated to 115° C. under a pressure of 5 atmospheres absolute in a heat exchanger 6 and then expanded to 15 mm. Hg in an expansion vessel 7, cooling to 55° C. thus taking place. The solution (now consisting of 100 parts of polyacrylonitrile, 3.9 parts of acrylonitrile and methyl acrylate and 388.1 parts of dimethylforamide is conveyed by a gear pump 14 into a second heat exchanger 8, heated to 115° C. at a pressure of 5 atmospheres absolute and again expanded to 15 torr in a second expansion vessel 9 so that the desired solution consists of 100 parts of polyacrylonitrile, 1.3 parts of acrylonitrile and methyl acrylate and 298 parts of dimethylformamide.

The vapor (consisting of 11.2 parts of acrylonitrile and methyl acrylate and 194.5 parts of dimethylformamide) formed in the two expansion zones 7 and 9 is condensed in a condenser 11 and the condensate added to the top of a packed column 12 operating at a pressure of 180 mm. Hg. 13.3 parts of dimethylformamide is withdrawn in liquid form from the bottoms of this column 12. The remaining 181.2 parts of dimethylformamide is passed, together with an excess of dimethylformamide which is circulated, to an evaporator 13 whence it is passed as a vapor to the lower end of the packed column 12. 181.2 parts of dimethylformamide, laden with the 11.2 parts of acrylonitrile and methyl acrylate of the liquid supplied, escapes as vapor at the top of the column. This vapor is passed into the bottom of the tray column 2 for removal of monomers from the nitrile-containing polymer solution.

We claim:

1. A continuous process for removing unreacted monomers from solutions of acrylonitrile polymers having at least 85% by weight of acrylonitrile units in dimethylformamide and for concentrating these solutions which comprises expelling monomeric acrylonitrile from 10 to 30% by weight solutions of acrylonitrile polymers which contain 10 to 30% by weight of volatile residual monomers with reference to the total weight of the solution in a substantially vertical separation zone at from 50 to 300 mm. Hg and 40° to 120° C., supplying vaporous dimethylformamide to the lower end of the separation zone and withdrawing at the upper beginning of the separation zone monomeric acrylonitrile together with some of the dimethylformamide in vapor phase, expanding the solution flowing away at the end down to a pressure of 5 to 100 mm. Hg in a first expansion zone, withdrawing the vaporous product thus formed, heating the solution (cooled by expansion) in a heating zone to the extent of 20° to 100° C. at a pressure which is higher than the vapor pressure of the solution at the temperature used, and then expanding to a pressure of 5 to 100 mm. Hg in a second expansion zone, and separating the vaporous products formed from the solution.

2. A process as claimed in claim 1 wherein the solution, after it has left the separation zone and before it enters the first expansion zone is heated in a heating zone by 10° to 50° C. at a pressure which is higher than the vapor pressure of the solution at the temperature used.

3. A process as claimed in claim 1 wherein the vaporous dimethylformamide vaporized in the two expansion zones is condensed, acrylonitrile still present is separated by distillation from the condensate which may contain acrylonitrile, and the remainder of the condensate is vaporized and recycled to the end of the first separation zone.

4. A process as claimed in claim 1 wherein downstream of the final expansion zone the viscosity of the acrylonitrile polymer solution is continuously measured and the temperature of the product after heating or the pressure in the expansion zones is regulated by a conventional method in dependence on the viscosity.

References Cited
UNITED STATES PATENTS

| | | | |
|---|---|---|---|
| 3,449,286 | 6/1969 | Szita et al. | 260—32.6 N |
| 3,454,542 | 7/1969 | Cheape, Jr., et al. | 260—88.7 B |
| 3,463,616 | 8/1969 | Corradi et al. | 260—32.6 N |

MORRIS LIEBMAN, Primary Examiner

S. L. FOX, Assistant Examiner

U.S. Cl. X.R.

260—34.2, 85.5, 88.7